US011279366B1

(12) United States Patent
Shroll et al.

(10) Patent No.: US 11,279,366 B1
(45) Date of Patent: Mar. 22, 2022

(54) FEEDFORWARD MECHANISM WITH SIGNAL DECAY FOR TORQUE ADJUSTMENT IN DIESEL ENGINE OPERATION

(71) Applicant: DEERE & COMPANY, Moline, IL (US)

(72) Inventors: Andrew Shroll, Cedar Falls, IA (US); Omkar Dumbre, Pune (IN); Taner Tuken, Cedar Falls, IA (US)

(73) Assignee: DEERE & COMPANY, Moline, IL (US)

( * ) Notice: Subject to any disclaimer, the term of this patent is extended or adjusted under 35 U.S.C. 154(b) by 0 days.

(21) Appl. No.: 16/950,597

(22) Filed: Nov. 17, 2020

(51) Int. Cl.
*B60W 30/188* (2012.01)
*F02D 41/14* (2006.01)
(Continued)

(52) U.S. Cl.
CPC ........... *B60W 30/188* (2013.01); *A01F 12/30* (2013.01); *B60W 10/02* (2013.01); *B60W 10/06* (2013.01); *B60W 10/10* (2013.01); *B60W 30/1884* (2013.01); *B60W 50/0097* (2013.01); *F02D 41/1401* (2013.01); *B60W 2300/158* (2013.01); *B60W 2510/0208* (2013.01); *B60W 2510/0638* (2013.01); *B60W 2510/0657* (2013.01); *B60W 2710/0666* (2013.01);
(Continued)

(58) Field of Classification Search
CPC .... B60W 30/188; B60W 10/02; B60W 10/06;
B60W 10/10; B60W 50/097; B60W 2300/158; B60W 2510/0657; B60W 2510/0638; B60W 2510/0208; B60W 2710/0666; B60W 30/1884; F02D 2041/141; F02D 2041/1412
See application file for complete search history.

(56) References Cited

U.S. PATENT DOCUMENTS 4,862,851 A   9/1989  Washino et al.
5,429,089 A * 7/1995  Thornberg ............ F02D 31/001
                                                     123/352

(Continued)

FOREIGN PATENT DOCUMENTS

CN    108071502 A  *  5/2018
CN    106351280 B  *  7/2018
(Continued)

*Primary Examiner* — Roger L Pang
(74) *Attorney, Agent, or Firm* — Michael Best & Friedrich LLP

(57) ABSTRACT

Systems and methods of controlling operation of a diesel engine using feedforward load anticipation. An electronic controller determines a difference between an actual engine speed value of the diesel engine and a desired engine speed value, and generates a feedback control command based on the determined difference. In response to detecting one or more conditions indicative of an anticipated mechanical load event that will alter a total mechanical load of the diesel engine, the electronic controller applies a feedforward offset to the feedback control command in accordance with a feedback offset function. The feedback offset function causes the magnitude of the feedback offset to decrease over a period of time until the offset returns to zero (i.e., a signal decay function). The diesel engine is then operated based on the feedback control command and the feedforward offset.

14 Claims, 7 Drawing Sheets

(51) Int. Cl.
  *B60W 10/02* (2006.01)
  *B60W 10/10* (2012.01)
  *B60W 50/00* (2006.01)
  *A01F 12/30* (2006.01)
  *B60W 10/06* (2006.01)

(52) U.S. Cl.
  CPC .. *F02D 2041/141* (2013.01); *F02D 2200/101* (2013.01); *F02D 2200/1002* (2013.01)

(56) References Cited

U.S. PATENT DOCUMENTS

| | | | |
|---|---|---|---|
| 6,564,774 B2 | 5/2003 | Ellims et al. | |
| 2014/0257651 A1* | 9/2014 | Dai | F02D 31/008 |
| | | | 701/54 |

FOREIGN PATENT DOCUMENTS

| | | | | |
|---|---|---|---|---|
| CN | 110259591 A | * | 9/2019 | ............. F02D 41/30 |
| JP | 2505018 B2 | | 6/1996 | |

\* cited by examiner

FEEDFORWARD MECHANISM WITH SIGNAL DECAY FOR TORQUE ADJUSTMENT IN DIESEL ENGINE OPERATION

BACKGROUND

The present invention relates to systems and methods for controlling the operation of a diesel engine such as, for example, the diesel engine of a combine harvester.

SUMMARY

Some electronically-controlled diesel engines are configured to be controlled by engine-speed-based feedback where "speed error" (i.e., a different between actual engine speed and target engine speed) is used to calculate a torque/fueling value which is then, in turn, used to control the engine. For example, a proportional-integral-derivative (PID) controller might be used to adjust the engine control setting (e.g., torque/fueling). In some implementations, changes in the engine load are only accounted for by a corresponding change in the engine control setting after the change in engine load results in a change in engine speed, which is then reflected as a "speed error." Large, sudden load changes can cause large speed drops.

In some implementations, a feedforward signal based on "load anticipation" can be used to address sudden load increases and sudden load decreases. By accurately controlling the timing and magnitude of this load anticipation adjustment, potential benefits can be realized. For example, the air system can be adjusted to a state (e.g., turbo speed, etc.) to better support a large fueling increase when the increased load is realized.

In some implementations, a diesel engine control system is configured to apply feedforward control (i.e., load anticipation) with a signal decay mechanism. The torque/fueling command applied to the engine is a summation of the feedback control torque/fueling command (e.g., from the PID) and a feedforward control torque/fueling command. In some implementations, a safety check is applied to the summed commands to ensure that engine operation remains within defined safe operating ranges (e.g., a defined engine speed "envelope). In some implementations, the decay of the feedforward control signal (e.g., a first order filter) allows feedback control to seamlessly resume full control after the load event has occurred. In some implementations, the feedforward control mechanism is not dependent on a continuous signal from the vehicle (which would have torque accuracy requirements) and instead is only applied as a step change increase with the corresponding signal decay. As discussed in further detail below, modeling results show relatively robust performance improvements as compared to a baseline of feedback-only control with limited sensitivity to timing and magnitude of the load anticipation signal.

In one embodiment, the invention provides a method of controlling operation of a diesel engine using feedforward load anticipation. An electronic controller determines a difference between an actual engine speed value of the diesel engine and a desired engine speed value, and generates a feedback control command based on the determined difference. In response to detecting one or more conditions indicative of an anticipated mechanical load event that will alter a total mechanical load of the diesel engine, the electronic controller applies a feedforward offset to the feedback control command in accordance with a feedback offset function. The feedback offset function causes the magnitude of the feedback offset to decrease over a period of time until the offset returns to zero. The diesel engine is then operated based on the feedback control command and the feedforward offset. For example, in some implementations, the values of the feedback control command and the feedforward offset are summed to produce a total torque command output.

In another embodiment, the invention provides a system for controlling operation of a diesel engine using feedforward load anticipation. The system includes an electronic controller (e.g., an electronic processor communicatively coupled to a non-transitory computer-readable memory storing computer-executable instructions that, when executed by the processor, control the operation of the controller). The electronic controller is configured to determine a difference between an actual engine speed value of the diesel engine and a desired engine speed value, and to generate a feedback control command based on the determined difference. In response to detecting one or more conditions indicative of an anticipated mechanical load event that will alter a total mechanical load of the diesel engine, the electronic controller applies a feedforward offset to the feedback control command in accordance with a feedback offset function. The feedback offset function causes the magnitude of the feedback offset to decrease over a period of time until the offset returns to zero. The electronic controller then generates one or more control signals to actuators of the diesel engine that cause the diesel engine to operate based on a torque output command indicative of a sum of the feedback control command and the feedforward offset.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

Figure 1:
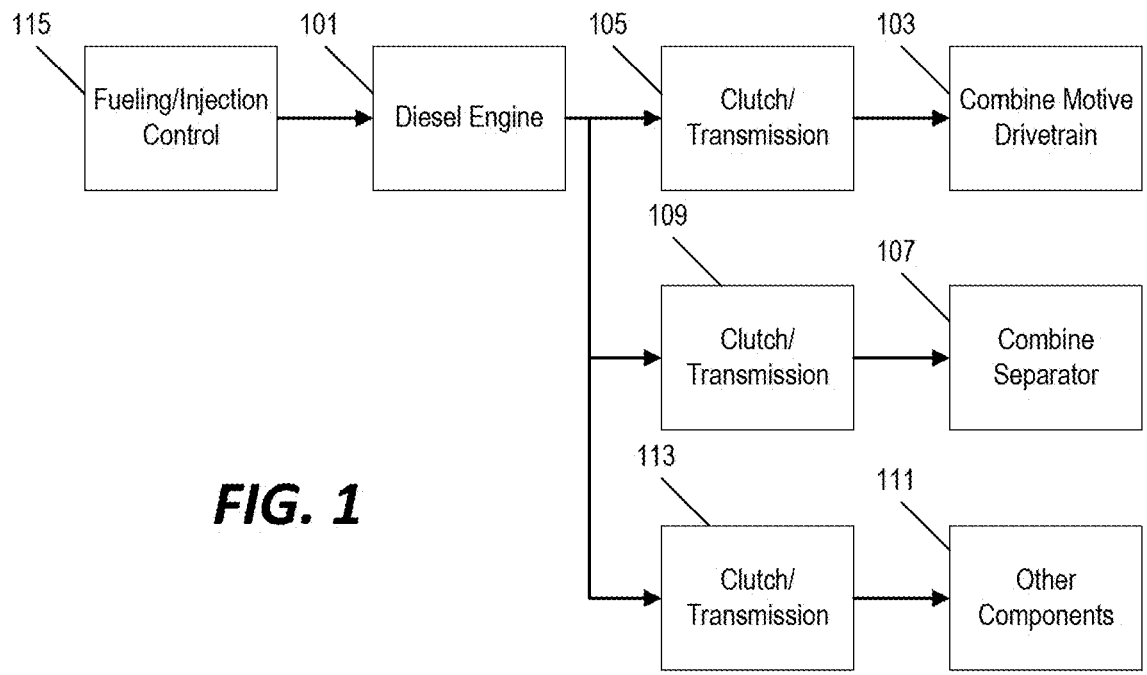
FIG. 1 is a block diagram of a mechanical power distribution system for a combine harvester according to one implementation.

FIG. 1 illustrates an example of a mechanical power distribution system for a combine harvester with an electronically-controlled diesel engine 101. The diesel engine 101 is selectively couplable to the motive drivetrain 103 of the combine harvester by a clutch and/or transmission 105. The clutch/transmission 105 is configured to controllably transfer mechanical power from the diesel engine 101 to the motive drivetrain 103 in order to control the vehicle movement of the combine harvester. In some implementations, the clutch transmission 105 is configured to controllably and selectively couple and decouple the motive drivetrain 103 and the diesel engine 101 and, in some implementations, is configured to controllably regulate the amount of mechanical power that is transferred to the motive drivetrain 103 in order to regulate the movement speed of the combine harvester.

Similarly, in the example of FIG. 1, the diesel engine 101 is also selectively and controllably couplable to a combine separator 107 by another clutch/transmission 109. The clutch/transmission 109 is configured to controllably transfer mechanical power from the diesel engine 101 to the combine separator 107 in order to operate the combine separator 107. In some implementations, the clutch/transmission 109 is configured to controllably and selectively couple and decouple the combine separator 107 and the diesel engine 101 and, in some implementations, is configured to controllably regulate the amount of mechanical power that is transferred to the combine separator 107 in order to regulate the operating speed of the combine separator 107. In some implementations, the diesel engine 101 is also mechanically coupled to other mechanical system components 111 in addition to or instead of the combine separator 109 by a controllable clutch/transmission 113.

The operation of the diesel engine 101 is controlled by control input signals received from an electronic controller (as discussed further below). Control variables including, for example, fuel injection amount and timing can be controllably adjusted to change performance variables such as engine speed and engine torque. In the example of FIG. 1, a fueling/injection control system 115 provides a control signal input to the diesel engine 101 to regulate the operation of the diesel engine 101.

Figure 2:
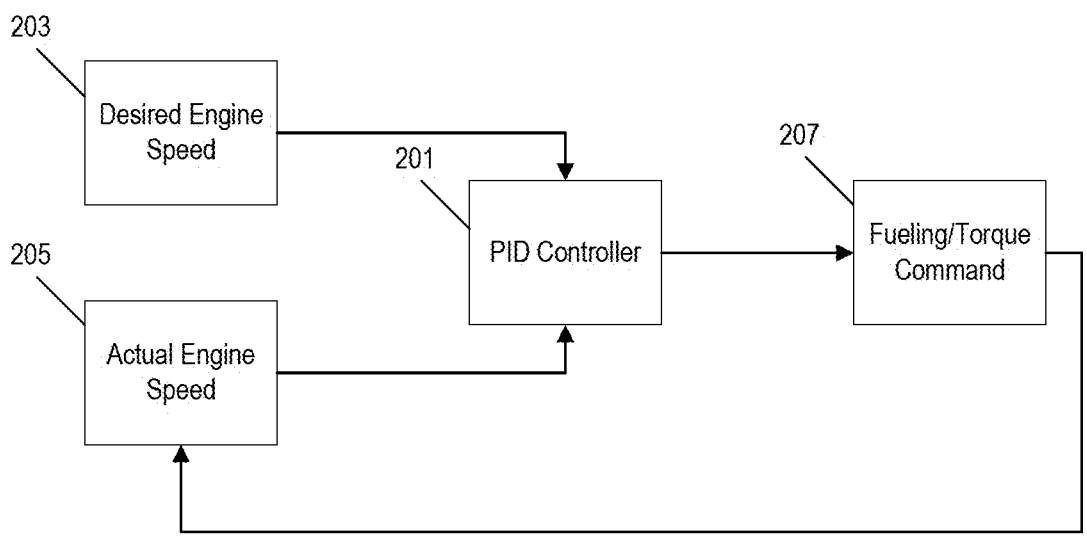
FIG. 2 is a flowchart of a method for operating the diesel engine in the system of FIG. 1 based on engine speed feedback.

FIG. 2 illustrates an example of a feedback-based mechanism for controlling the diesel engine 101. A PID controller 201 (i.e., "proportional-integral-derivative") is a feedback controller configured to adjust a control signal output based on monitored differences between a sensed actual value of a performance variable and a target value of the performance variable in order to cause the actual value of the performance variable to approach the target value. In the example of FIG. 2, the PID controller 201 receives as input a desired engine speed value 203 and a sensed actual engine speed value 205 and, based on these input values, regulates and adjusts an output signal indicative of a fueling/torque command 207 that is provided as a control input to the diesel engine 101 which may cause a change in the actual value of the engine speed 205. The feedback mechanism of FIG. 2 continues to operate as a feedback control loop such that a change in the actual engine speed value 205 (e.g., resulting from a change in the fueling/torque command) results in a change in the inputs to the PID controller 201 that, in turn, causes the PID controller 201 to further adjust the fueling/torque command 207 until the actual engine speed value 205 reaches the desired engine speed value 203.

The mechanical load on the diesel engine 101 will change, for example, when mechanical systems/components are engaged or disengaged and when operating conditions change (e.g., when the combine harvester moves from operating on a flat surface to operating on an incline. Unless the control variables for the diesel engine 101 are also changed, an increased mechanical load will result in a corresponding decrease in engine speed of the diesel engine 101 and, conversely, a decreased mechanical load will result in a corresponding increase in engine speed of the diesel engine 101.

Figure 3:
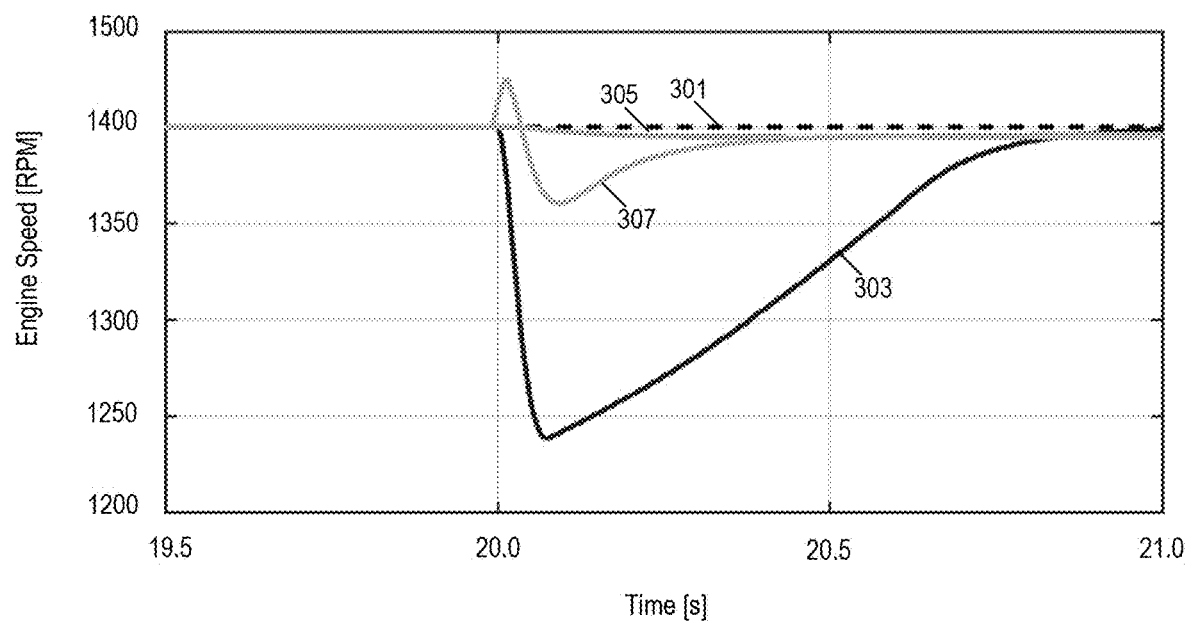
FIG. 3 is a graph of changes in engine speed as a function of time in response to a change in engine load.

FIG. 3 illustrates an example (line 303) in which an increased mechanical load is applied to the diesel engine 101 of FIG. 1 (at time=20.0 s). The increased mechanical load causes the engine speed to decrease substantially. As illustrated in FIG. 2, the actual engine speed value 205 is provided as an input to the PID controller 201 and, as the actual engine speed value 205 decreases due to the increased mechanical load, the PID controller 201 gradually adjusts the fueling/torque command signal 207 to the diesel engine 101, which causes the engine speed to gradually rise back to the desired engine speed value 203 (i.e., approximately 1400 RPM in the example of FIG. 3).

Without mitigation, a change in engine speed due to the change in mechanical load will also affect the performance of other systems/components that receive mechanical operating power from the diesel engine 101. For example, when the combine separator 107 is engaged by the clutch/transmission 109, the actual engine speed of the diesel engine 101 is decreased. Because the diesel engine 101 is also providing mechanical power to the motive drivetrain 103 of the combine harvester at the same time, the vehicle movement of the combine harvester may suddenly change (e.g., "jerk") as a result of the sudden decrease in engine speed due to the engagement of the combine separator 107.

Figure 4:
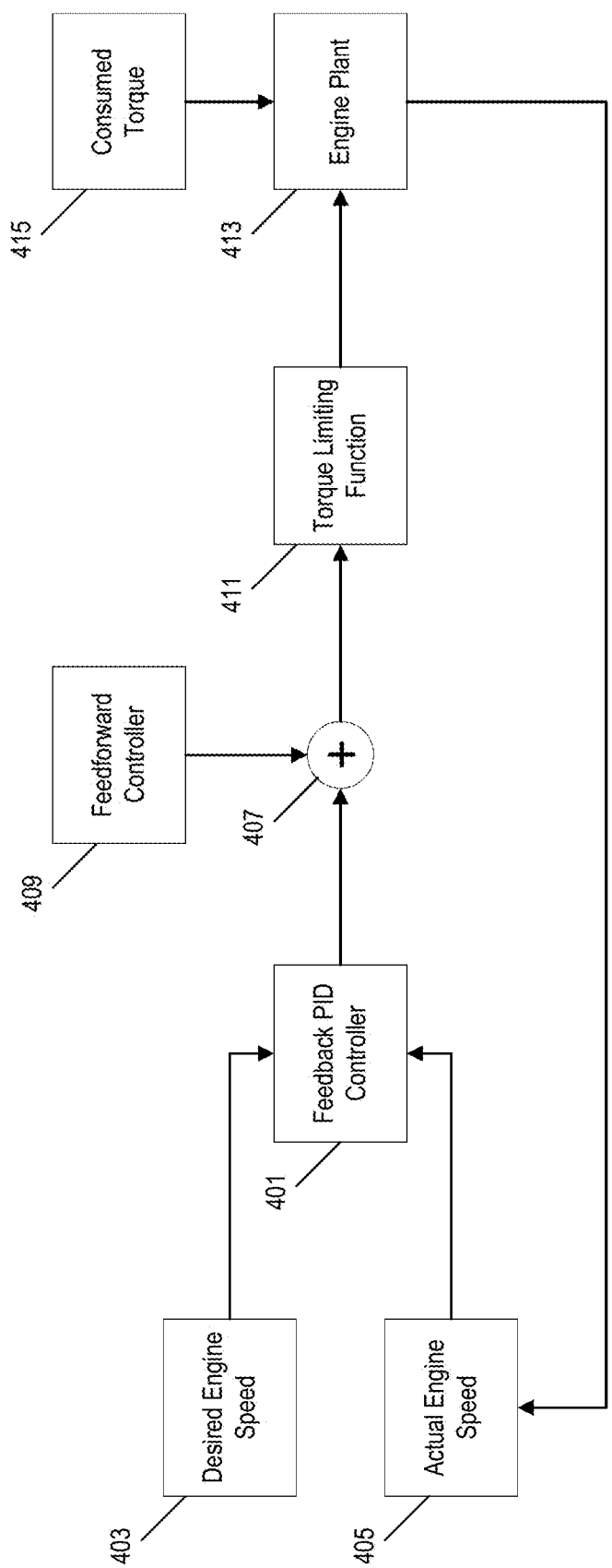
FIG. 4 is a flowchart of a method for operating the diesel engine in the system of FIG. 1 using both a feedback and a feedforward mechanism for controlling engine torque.

FIG. 4 illustrates a method for mitigating the effect of changes in mechanical load on engine speed by applying a feedforward mechanism with a signal delay to cause the engine to be operated in anticipation of a change in mechanical load (i.e., "load anticipation"). In the example of FIG. 4, a PID feedback controller 401 receives as inputs a desired engine speed value 403 and an actual engine speed value 405 and outputs a feedback control torque command that will cause the actual engine speed value 405 to approach the desired engine speed value 403. In some implementations, the feedback control torque command is a control signal configured to adjust or operate one or more control variables of the diesel engine 101 in order to affect the engine torque. For example, in some implementations, the feedback control torque command is an indication of a numeric value of a torque output to be achieved by the diesel engine 101.

However, unlike the example of FIG. 2, before the operation of the diesel engine 101 is adjusted based on the feedback control torque command, the feedback control torque command is summed 407 with a feedforward control torque command from a feedforward control 409. The feedforward control 409 is configured to detect or anticipate when an event is about to occur that will cause a change to the mechanical load on the diesel engine 101—for example, when a process is initiated that will result in the combine separator 107 being engaged or disengaged. In some implementations, the engagement and/or operation of the various clutch/transmissions 105, 109, 113 is controlled by an electronic system controller and, therefore, the electronic controller is able to determine in advance when the mechanical load is to be applied to the diesel engine 101. Alternatively or additionally, in some implementations, the system may also include one or more sensors configured to detect information indicative of an imminent change in mechanical load. Also, in some implementations, the system may be configured to detect an initial change in engine speed and, in response, determine the extent and timing of the mechanical load that is to come based on the initial change in engine speed.

Figure 5:
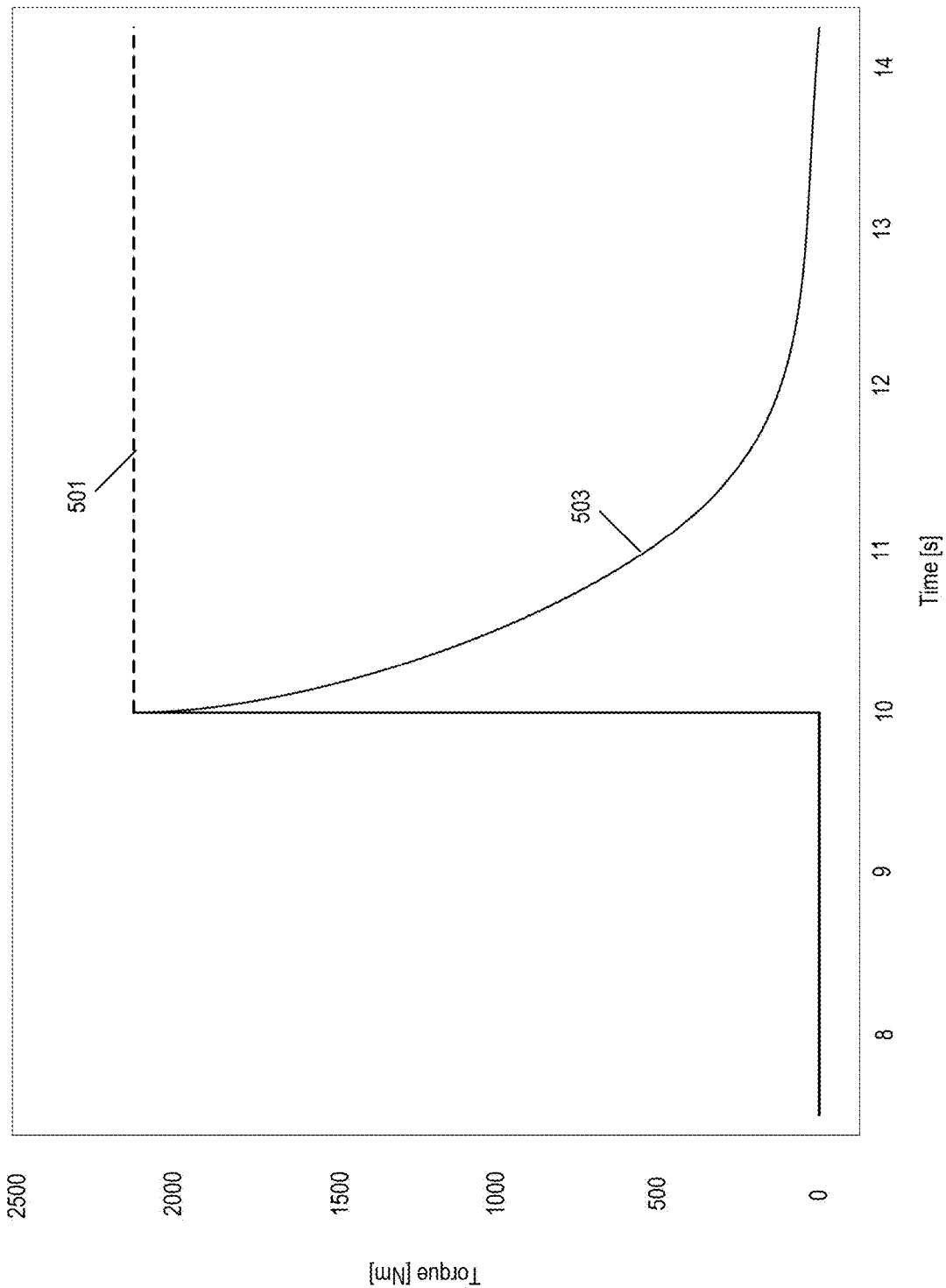
FIG. 5 is a graph of a feedforward adjustment added to the result of the feedback system in the method of FIG. 4 for load anticipation.

FIG. 5 illustrates an example of the feedforward control torque command that may be applied by the feedforward control 409 when an imminent change in mechanical load is detected. In some implementations, the feedforward control torque command is applied as a step input function that, when summed with the feedback control torque command, will offset the total control torque command by a defined amount corresponding to the anticipated load. For example, in FIG. 5, the feedforward control 409 anticipates that a torque adjustment of approximately 2000 Nm will be required in order to maintain the current desired engine speed value when the anticipated load is applied to the diesel engine 101. Accordingly, the feedforward control torque command 501 is increased from 0 Nm to 2000 Nm at or around the anticipated timing of the mechanical load change (i.e., time=10 s in FIG. 5). When the feedforward control torque command and the feedback control torque command are summed (at step 407 in FIG. 4) before the anticipated timing of the mechanical load change, the feedforward control torque command is equal to 0 Nm and the total torque command remains equal to the output of the PID feedback controller 401. However, after the anticipated timing of the mechanical load change, the summation 407 of the feedforward control torque command and the feedback control torque command offsets the output of the PID feedback controller 401 by 2000 Nm.

In some implementations, the feedforward control 409 is configured to provide an offset to the control torque command using a step input function (as illustrated by FIG. 501). In some implementations, this offset is then reduced back to zero after a defined period of time has elapsed or when the difference between the actual engine speed value 405 and the desired engine speed value 403 falls below a threshold. In other implementations, the value of the feedforward control torque command is gradually reduced based on feedback from one or more engine sensors. For example, in some implementations, the feedforward control 409 may be configured to monitor a difference between the actual engine speed value 405 & the desired engine speed value 403 and to proportionally reduce the feedforward control torque command proportionally as the difference between the actual engine speed value 405 & the desired engine speed value 403 decreases.

However, as illustrated in the example of FIG. 5 by line 503, in some implementations, the feedforward control 409 is configured to output a feedforward control torque command that begins at a magnitude as defined by a step input (e.g., begins at 2000 Nm) and that gradually declines over time according to a predefined decay function. Accordingly, once a feedforward control offset is initiated in response to an anticipated load change, the value of the feedforward control torque command output by the feedforward control 409 is dependent only on the time that has elapsed since the signal offset was initiated.

In some implementations, both the shape and the initial magnitude of the predefined decay function used by the feedforward control 409 is the same for all load change events. In other implementations, the shape of the predefined decay function is scaled to various different torque magnitudes and time durations based on the specific type of anticipated load change. In still other implementations, the feedforward control 409 is configured to store a plurality of different predefined decay functions each corresponding to a different type of anticipated load event. For example, the feedforward control 409 may be configured to access and apply a first predefined decay function in response to determining that the combine separate 107 is about to be engaged and to access & apply a second predefined decay function in response to determining that a different mechanical component is about to be engaged.

Returning now to the example of FIG. 4, after output of the feedback PID controller 401 and the output of the feedforward controller 409 are summed (at 407), a torque limiting function 411 is applied as a safety mechanism. For example, in some implementations the torque limiting function 411 is configured to prevent the total output torque command from exceeding a maximum torque threshold by reducing the total output torque command to a defined maximum value when the combined sum of the feedback command and the feedforward command exceed a threshold. Similarly, in some implementations, the torque limiting function 411 may be configured to regulate a rate of change of the torque command to prevent sudden increases/decreases in the torque command that might exceed defined limits for the diesel engine 101.

After the torque limiting function 411 is applied, the diesel engine 101 (i.e., engine plant 415) is operated based on the summed torque command (i.e., the total torque command). For example, in some implementations, the electronic controller is configured to identify a set of engine control values (e.g., fuel injection amount, fuel injection timing, spark timing, valve timing, etc.) that correspond to the total torque command and to generate one or more output signals to apply the identified set of engine control values to the diesel engine 101. The diesel engine plant 413 operates according to the identified set of engine control values and generates an engine torque output corresponding to the total torque command. The torque produced by the engine plant 413 is "consumed" by the various mechanical components/system that are coupled to draw their operating power from the engine plant 413.

When the consumed torque 415 exceeds the total torque generated by the engine plant 413, then the difference between the actual engine speed value 405 and the desired engine speed value 403 will increase as the actual engine speed value 405 decreases. Similarly, if the total torque generated by the engine plant 413 exceeds the consumed torque 415, then the difference between the actual engine speed value and the desired engine speed value will also increase, but with the actual engine speed value 405 increasingly exceeding the desired engine speed value 403. However, when the consumed torque 415 matches the total torque generated by the engine plant 413, then the actual engine speed value 405 will similarly approach the desired engine speed value 403.

Figure 6:
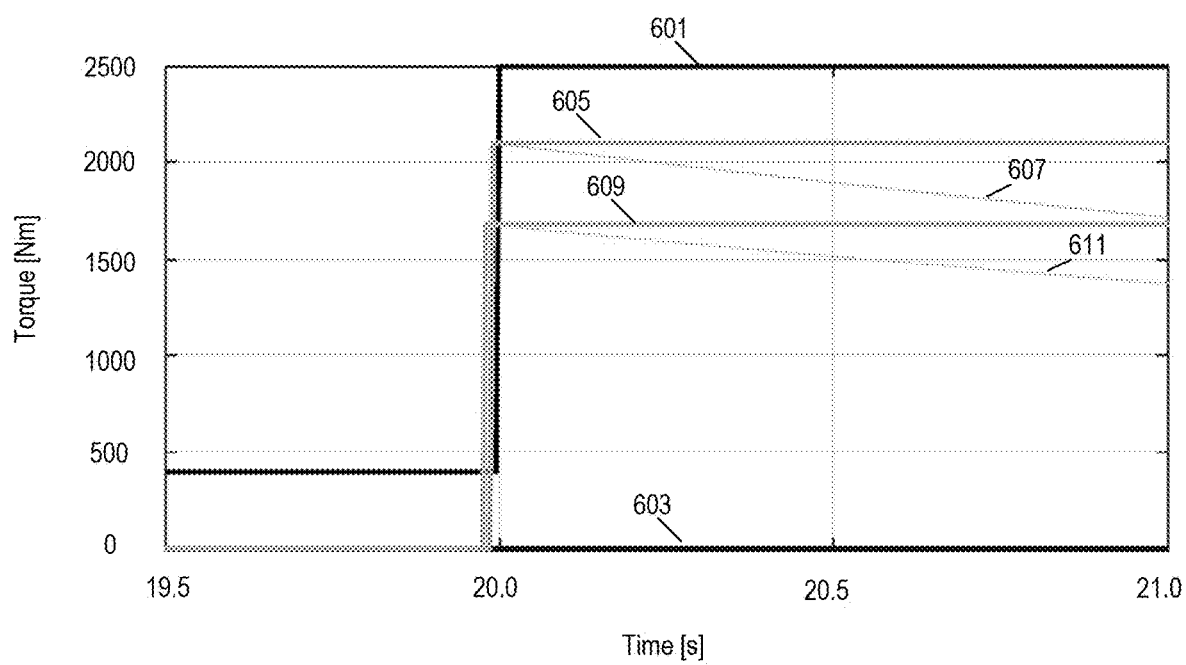
FIG. 6 is a graph of the engine torque adjustments applied for the feedforward mechanism in the examples of FIG. 3.

FIG. 6 illustrates a variety of different feedforward control torque command values that may be applied in anticipation of a mechanical load event. Line 601 is a brake torque model input. Line 603 is the command offset applied without any feedforward control (i.e., the offset remains zero). Line 605 is the step input value of the "ideal" feedforward control offset. Line 607 is the ideal feedforward control offset with a decay function. Line 609 is an example of a step input value for a feedforward control offset that is slightly less than the "ideal" offset of line 605. Finally, line 611 is the example feedforward control offset with a decay function.

The engine speed values corresponding to each of these feedforward offset control strategies are illustrated in FIG. 3. As discussed above, line 301 represents the desired engine speed value and line 303 represents the actual engine speed value after a mechanical load event when the engine is controlled only with the feedback control 401 and without any offset from the feedforward control 409. Without any feedforward offset, the actual engine speed falls from 1400 RPM to less than 1250 RPM before beginning to gradually rise back up to the desired engine speed of 1400 RPM. The "ideal" feedforward control offset (represented by line 305) would cause the actual engine speed to deviate only slightly from the desired engine speed of 1400 RPM.

In the feedforward control mechanism illustrated by line 307, the feedforward control torque command offset causes the actual engine speed to increase above the desired engine speed of 1400 RPM before the mechanical loading event occurs. When the mechanical loading event occurs, the actual engine speed falls below the desired engine speed of 1400 RPM, but does not fall nearly as far as the actual engine speed without the feedforward offset (i.e., the example of line 303) and is able to recover to approach the desired engine speed of 1400 RPM in much shorter time.

Figure 7:
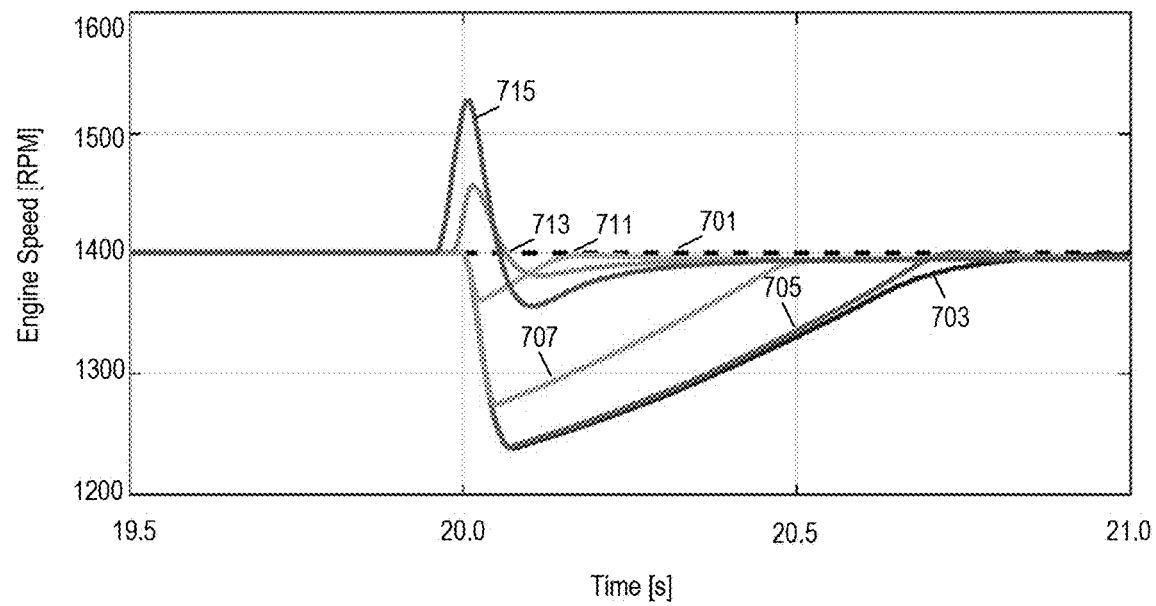
FIG. 7 is a graph of changes in engine speed as a function of time demonstrating time sensitivity of the load anticipation feedforward mechanism of FIG. 4.
Figure 8:
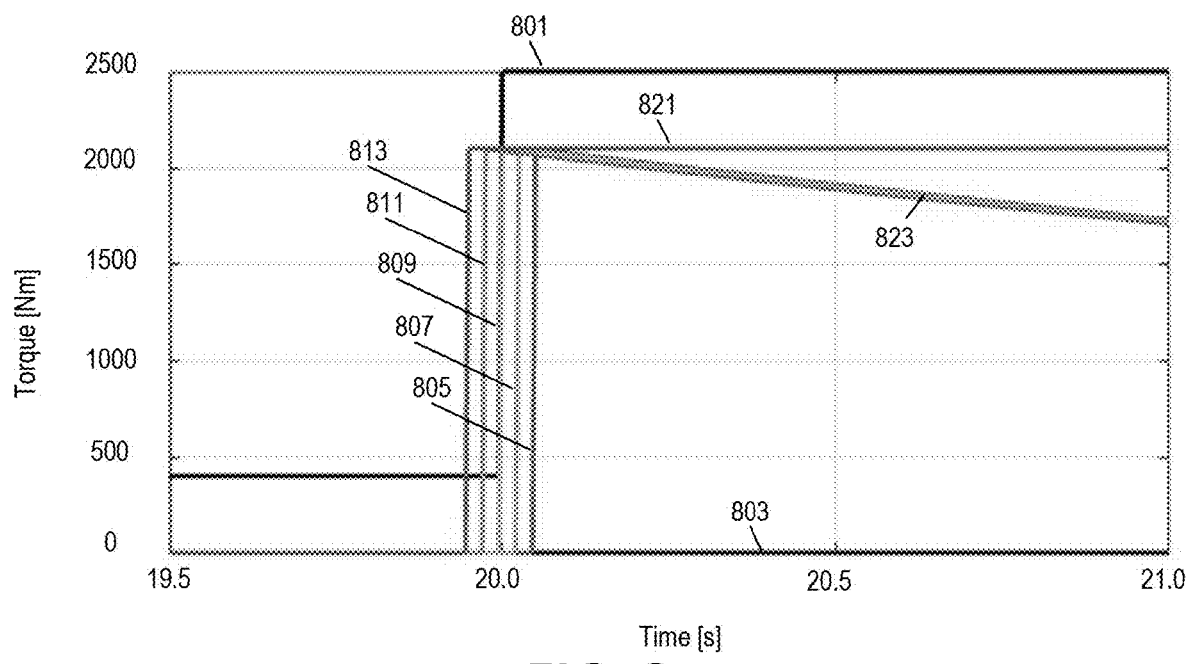
FIG. 8 is a graph of changes in engine torque adjustments applied for the feedforward mechanism for the examples of FIG. 7.

FIGS. 7 and 8 illustrate how the engine speed performance can be impacted by the timing of when the feedforward offset is initiated (i.e., the "timing sensitivity"). In FIG. 7, line 701 illustrates the desired engine speed value (i.e., 1400 RPM) and line 703 illustrates the actual engine speed when no feedforward offset is applied (i.e., operating only on feedback control). Line 705 illustrates the actual engine speed when the feedforward offset is applied 0.05 seconds after the timing of the mechanical load event. Line 707 illustrates the actual engine speed when the feedforward offset is applied 0.025 seconds after the timing of the mechanical load event. Line 711 illustrates the actual engine speed when the feedforward offset is applied at exactly the same time as the mechanical load event. Line 713 illustrates the actual engine speed when the feedforward offset is applied 0.025 seconds before the mechanical load event. Line 715 illustrates the actual engine speed when the feedforward offset is applied at 0.05 seconds before the mechanical load event.

FIG. 8 illustrates the magnitude and timing of each feedforward offset corresponding to the examples of FIG. 7. Line 801 is a brake torque model input and line 803 represents operation without the feedforward offset (i.e., a feedforward offset equals zero). Line 805 is the feedforward offset signal applied 0.05 seconds after the mechanical load event and corresponds to the example of line 705 in FIG. 7. Line 807 is the feedforward offset signal applied 0.025 seconds after the mechanical load event and corresponds to the example of line 707 in FIG. 7. Line 809 is the feedforward offset signal applied at exactly the same time as the mechanical load event and corresponds to the example of line 711 in FIG. 7. Line 811 is the feedforward offset signal applied 0.025 seconds before the mechanical load event and corresponds to the example of line 713 in FIG. 7. Finally, Line 813 is the feedforward offset signal applied at 0.05 seconds before the mechanical load event and corresponds to the example of line 715 in FIG. 7.

FIG. 8 illustrates that, although the timing at which the offset is applied is varied in these examples, the step input magnitude of each feedforward offset 821 is the same. Similarly, each applied offset follows the same predefined decay function 823, which is correspondingly offset only by the timing at which each feedforward offset was initiated. However, as illustrated in FIG. 7, the timing of the feedforward offset relative to the timing of the mechanical load event has a noticeable impact on engine speed performance. When the feedforward offset is applied 0.05 seconds after the mechanical load event, the engine speed performance (line 705) is fairly similar to engine speed performance without any feedforward offset at all (line 703). However, if the feedforward offset is applied just 0.025 seconds earlier, the engine speed (line 707) does not fall as far and it recovers to the desired engine speed much more quickly. Conversely, if the feedforward offset is applied too soon (e.g., at 0.05 seconds before the mechanical loading event as illustrated by line 715), the engine speed value will rise significantly and, in order to compensate, the feedback control mechanism will cause the engine speed to also fall below the desired engine speed before the actual engine speed returns to the target engine speed. However, despite the temporary rise in engine speed, actual engine speed returns to the desired engine speed more quickly than when the feedforward offset is applied after the mechanical load event (i.e., lines 705 and 707). As illustrated by line 713, when the feedforward offset is applied before the load event, but more closely to the occurrence of the load event, the engine speed will still temporarily rise above the desired engine speed, but the deviations above and below the desired engine speed are noticeably smaller than when the same feedforward offset is applied even slightly earlier. As illustrated by line 711, engine speed performance exhibits the most consistent performance when the feedforward offset is applied at exactly the same time as the mechanical loading event as there is no noticeable upward deflection of engine speed about the desired engine speed, the magnitude of the maximum engine speed decrease after the mechanical load event is lessened by the feedforward offset, and the actual engine speed returns to the desired engine speed more quickly.

Figure 9:
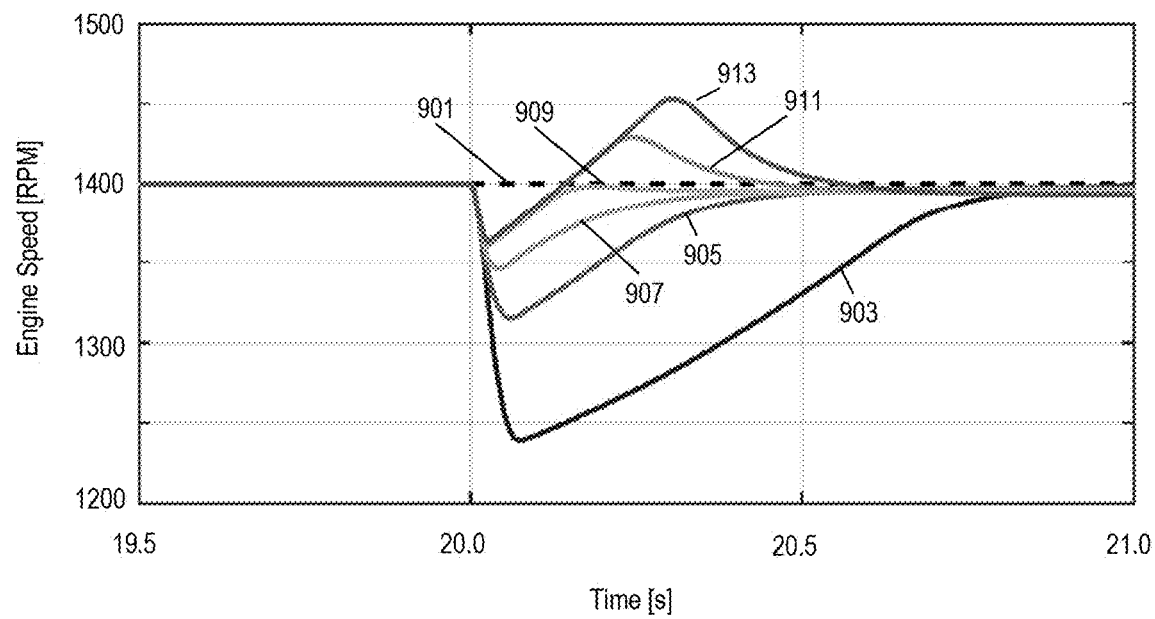
FIG. 9 is a graph of changes in engine speed as a function of time demonstrating magnitude sensitivity of the load anticipation feedforward mechanism of FIG. 4.
Figure 10:
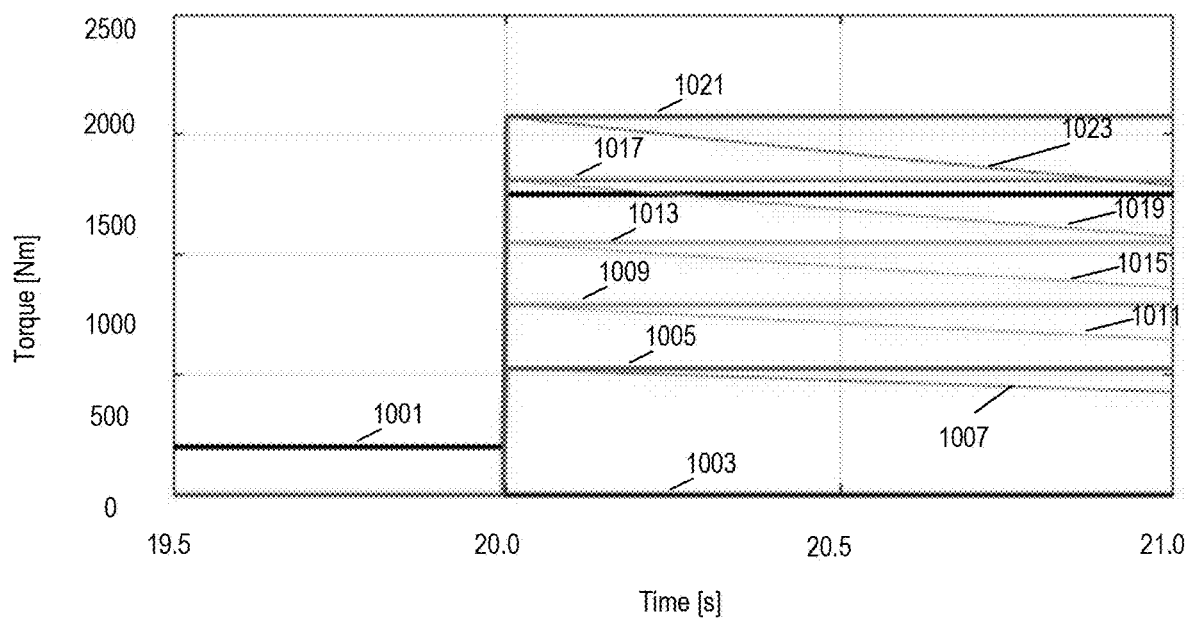
FIG. 10 is a graph of changes in engine torque adjustments applied for the feedforward mechanism in the examples of FIG. 9.

FIGS. 9 and 10 illustrate how engine speed performance is impacted by the relative magnitude of the feedforward offset. Line 901 represents the desired engine speed (i.e., 1400 RPMs) and line 903 illustrates the change in actual engine speed when no feedforward offset is applied and the engine is operated only based on feedback. Line 905 illustrates an example where the magnitude of the feedforward offset is 150% of the load applied by the mechanical load event. Line 907 illustrates an example where the magnitude of the feedforward offset is 125% of the load applied by the mechanical load event. Line 909 illustrates an example where the magnitude of the feedforward offset is 100% of the load applied by the mechanical load event. Line 911 illustrates an example where the magnitude of the feedforward offset is 75% of the load applied by the mechanical load event. Finally, line 913 illustrates an example where the magnitude of the feedforward offset is 50% of the load applied by the mechanical load event.

FIG. 10 illustrates the magnitude and timing of the feedforward offset applied in each of the examples of FIG. 9. Line 1001 represents a modeled torque of the mechanical load event (i.e., a brake torque model input) and line 1003 illustrates the feedforward offset applied when the engine is operated only based on feedback control 401 (i.e., no feedforward control 409). Line 1005 is the step input and line 1007 is the decay function for a feedforward offset that is equal to 150% of the load applied by the mechanical load event (corresponding to the example of line 905 in FIG. 9). Line 1009 is the step input and line 1011 is the decay function for a feedforward offset that is equal to 125% of the load applied by the mechanical load event (corresponding to the example of line 907 in FIG. 9). Line 1013 is the step input and line 1015 is the decay function for a feedforward offset that is equal to 100% of the load applied by the mechanical load event (corresponding to the example of line 909 in FIG. 9). Line 1015 is the step input and line 1017 is the decay function for a feedforward offset that is equal to 75% of the load applied by the mechanical load event (corresponding to the example of line 911 in FIG. 9). Finally, line 1021 is the step input and line 1023 is the decay function for a feedforward offset that is equal to 50% of the load applied by the mechanical load event (corresponding to the example of line 913 in FIG. 9). As illustrated in FIG. 10, the feedforward offset is applied at the exact same time as the mechanical load event in each of the examples illustrated in FIG. 9.

As illustrated by the examples in FIGS. 7 through 10, the engine speed performance can be improved by applying a feedforward offset to the torque demand at or around the same timing of a mechanical load event changes the mechanical load (and correspondingly the required torque) for the diesel engine. The engine performance can be further improved by tuning the feedforward offset based on the anticipated timing of the mechanical load event and the anticipated magnitude of the change in the mechanical load. In some implementations, the feedforward control 409 is configured to apply a feedforward offset signal that is initiated within +/−50 ms of the timing of the anticipated load event and with an offset magnitude that is within +/−30% of the magnitude of the change in mechanical load due to the anticipated load event.

Figure 11:
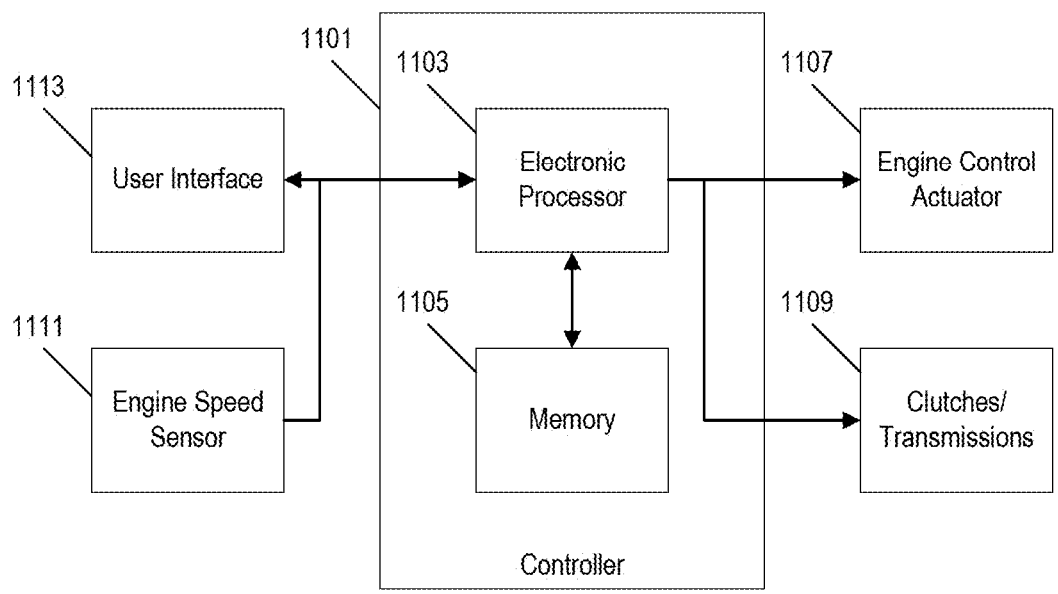
FIG. 11 is a block diagram of a control system for implementing the feedforward-based load anticipation mechanism for FIG. 4.

In various implementations, the systems and methods described above may be implemented by an electronic control system for a diesel engine. FIG. 11 illustrates one example of an electronic control system configured to implement these methods. A controller 1101 includes an electronic processor 1103 and a non-transitory computer-readable memory 1105. The memory 1105 stores data (e.g., defining the shape/magnitude of the predefined decay function(s), the criteria for anticipating a mechanical load, etc.) and computer-executable instructions that are accessed and executed by the electronic controller 1103 to provide the functionality of the controller 1101 (including the functionality described herein). The controller 1101 is communicatively coupled to one or more engine control actuators 1107 including, for example, a fuel injection system, valve control system, spark/ignition control system and is configured to transmit control signals to these actuators in order to control the operation of the diesel engine 101 (FIG. 1). The controller 1101 is also communicatively coupled to the clutches/transmissions 1109 that controllably couple the diesel engine 101 to the various different mechanical systems and components that draw mechanical operating power from the diesel engine 101. The controller 1101 is also communicatively coupled of one or more engine sensors that transmit signals to the controller 1101 indicative of the current operation of the diesel engine (e.g., operating variables). In the example of FIG. 11, the controller 1101 is communicatively coupled to an engine speed sensor 1111 and is configured to receive a signal from the engine speed sensor 1111 indicative of the current actual engine speed value for the diesel engine 101. Finally, the controller 1101 is communicatively coupled to a user interface 1113 configured to display information regarding the operation of the machine to the user and, in some implementations, to receive command inputs from the user. For example, the controller 1101 in the example of FIG. 11 may be configured to receive an input from a user through the user interface 1113 initiating operation of the combine separator 107. IN response, the controller 1101 may be configured to transmit a signal to the clutch/transmission 109 to engage the combine separator 107 to the diesel engine 101 and to initiate the feedforward control torque command offset (as discussed in the examples above).

Figure 12:
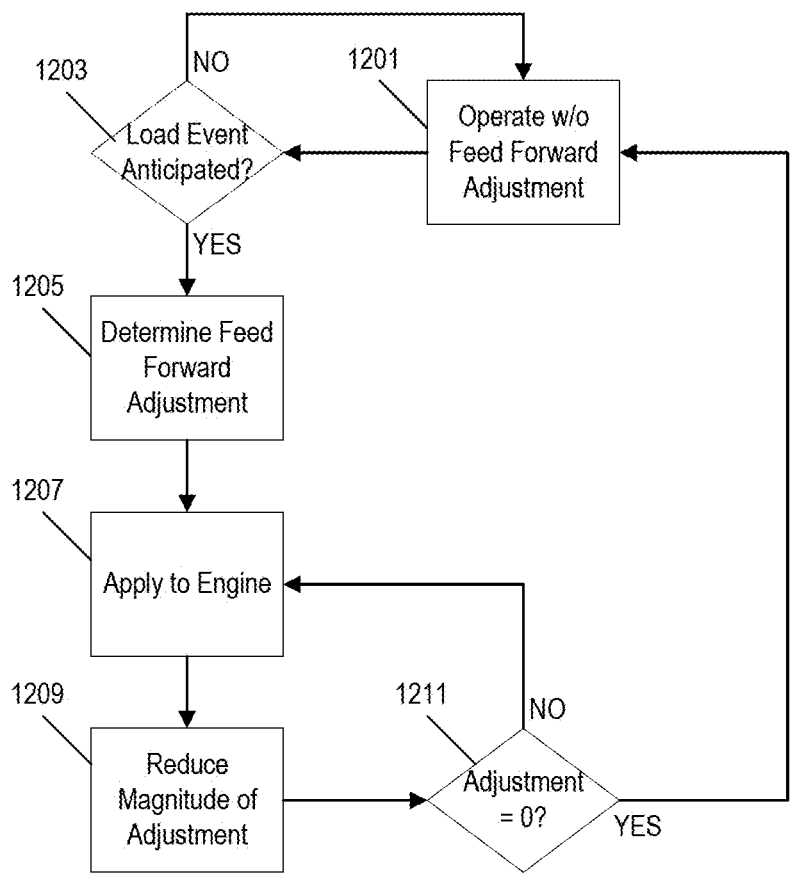
FIG. 12 is a flowchart of a method for determining and applying the feedforward adjustment to engine torque demand in the load anticipation mechanism of FIG. 4.

FIG. 12 illustrates an example of a method applied by the controller 1101 of FIG. 11 in applying the feedforward control torque command offset as discussed in the examples above. The controller 1101 operates the system without the feedforward adjustment (step 1201) using only the engine speed error-based feedback control until the controller detects conditions indicative of an anticipated load event (step 1203). As discussed above, an anticipated load event may be detected by the controller 1101, for example, in response to receiving an instruction to begin operating a mechanical component/system (e.g., the combine separator), in response to detecting changes in the engine speed, and/or in response to other sensor inputs indicative of an impending change in mechanical load. When an anticipated load event is detected by the controller 1101, the controller 1101 determines the appropriate feed forward adjustment (step 1205). For example, the controller 1101 may be configured to access a feedforward offset and decay function from the memory 1105 in response to detecting the anticipated load event. Furthermore, in some implementations where the controller 1101 is configured to detect multiple different types of anticipated load events, the controller 1101 may be configured to access a particular feedforward offset function from a plurality of feedforward offset functions stored to the memory 1105 (e.g., using information from a look-up table).

The controller 1101 then applies the feedforward offset to the engine (step 1207), for example, as described above in reference to FIG. 4. The magnitude of the adjustment is gradually reduced over time (e.g., as defined by the predefined decay function) (step 1209), until the magnitude of the feedforward adjustment reaches zero (step 1211) and operation of the diesel engine is again controlled entirely by the engine-speed-based feedback controller (step 1201).

The systems and methods described in the examples above are only a few examples of various different implementations and other implementations and configurations are possible. For example, instead of operating the feedforward control to apply an offset to the torque command in response to detecting an anticipated load change, the system might instead be configured to apply an offset to one or more engine control values in addition to or instead of offsetting the torque command. Furthermore, although the examples above discuss applying a feedforward adjustment in anticipation of an increase in the mechanical load, in some implementations, the system may be configured to apply a feedforward offset in anticipation of a decrease in the mechanical load (e.g., by applying a negative feedforward offset).

Also, the various different functional components described in some of the examples above may be implemented in one or more different electronic controllers or other electronic components. For example, in some implementations, the feedback PID controller 401, the feedforward controller 409, the torque limiting function 411 illustrated in the example of FIG. 4 are all implemented by computer-executable instructions executed by the same electronic processor while, in other implementations, the feedback PID controller 401 and the feedforward controller 409 are implemented in two separate electronic controllers. Similarly, in some implementations, the controller 1101 illustrated in FIG. 11 is configured to generate output signals to one or more engine actuators based on the total torque command output as determined by the method of FIG. 4. However, in some other implementations, the diesel engine 101 may include its own dedicated electronic controller configured to receive a torque command as input and to regulate the operation of the diesel engine by operating one or more engine actuators based on the received torque command input.

Accordingly, the invention provides, among other things, systems and methods for applying a feedforward control offset for a diesel engine with a signal decay function in anticipation of a change in mechanical load. Other features and advantages are set forth in the following claims.

What is claimed is:

1. A method of controlling operation of a diesel engine using feedforward load anticipation, the method comprising:
    determining, by an electronic controller, a difference between an actual engine speed value of the diesel engine and a desired engine speed value;
    generating, by the electronic controller, a feedback control command based on the determined difference;
    detecting, by the electronic controller, one or more conditions indicative of an anticipated mechanical load event that will alter a total mechanical load on the diesel engine;
    applying, by the electronic controller, a feedforward offset, based on said anticipated mechanical load event, to the feedback control command according to a feedback offset function, wherein according to the feedback offset function a magnitude of the feedback offset is decreased over a period of time; and
    operating the diesel engine based on the feedback control command and the feedforward offset.

2. The method of claim 1, wherein the feedback control command is indicative of a requested torque output for the diesel engine.

3. The method of claim 2, wherein generating the feedback control command includes using a PID control to determine a requested torque output that will cause the actual engine speed value to approach the target engine speed value.

4. The method of claim 1, wherein applying the feedforward offset to the feedback control command includes applying a feedforward offset with an initial magnitude indicative of an expected mechanical load change for the anticipated mechanical load event.

5. The method of claim 1, wherein applying the feedforward offset to the feedback control command includes applying a feedforward offset with an initial magnitude that is within 30% of an expected mechanical load change for the anticipated mechanical load event.

6. The method of claim 1, further comprising determining an estimated timing of an onset of the anticipated mechanical load event, and wherein applying the feedforward offset to the feedback control command includes initiating the feedforward offset within 50 ms of the onset of the anticipated mechanical load event.

7. The method of claim 1, further comprising:
    generating, by the electronic controller, a control signal to a clutch causing the clutch to engage a mechanical system with the diesel engine causing the mechanical system to draw operating power from an output of the diesel engine,
    wherein engagement of the mechanical system with the diesel engine is the anticipated mechanical load event, and
    wherein the detecting one or more conditions indicative of the anticipated mechanical load event initiating a process by the electronic controller to engage the mechanical system with the diesel engine.

8. The method of claim 7, wherein the mechanical system is a separator of a combine harvester.

9. The method of claim 1, further comprising operating, by the electronic controller, a transmission to regulate an amount of mechanical power generated by the diesel engine that is provided as operating power to a drivetrain system of a combine harvester.

10. The method of claim 1, further comprising:
    determining, by the electronic controller, whether a sum of the feedback control command and the feedforward offset exceeds a maximum torque output command limit;
    generating a torque output command equal to the sum of the feedback control command and the feedforward offset in response to determining that the sum of the feedback control command and the feedforward offset does not exceed the maximum torque output command limit; and
    generating a torque output command equal to a defined maximum torque output command in response to determining that the sum of the feedback control command and the feedforward offset exceeds the maximum torque output command limit.

11. The method of claim 1, further comprising generating, by the electronic controller, a torque output command by applying a smoothing filter to a sum of the feedback control command and the feedforward offset.

12. The method of claim 1, wherein the anticipated mechanical load event will alter the total mechanical load on the diesel engine by increasing the total mechanical load on the diesel engine, and wherein applying the feedforward offset to the feedback control command includes applying a positive feedforward offset value to produce a total torque output command for the diesel engine that is greater than a value of the feedback control command.

13. The method of claim 1, wherein the anticipated mechanical load event will alter the total mechanical load on the diesel engine by decreasing the total mechanical load on the diesel engine, and wherein applying the feedforward offset to the feedback control command includes applying a negative feedforward offset value to produce a total torque output command for the diesel engine that is less than a value of the feedback control command.

14. A system for controlling operation of a diesel engine using feedforward load anticipation, the system comprising an electronic controller configured to
    determine a difference between an actual engine speed value of the diesel engine and a desired engine speed value;
    generate a feedback control command based on the determined difference;
    detect one or more conditions indicative of an anticipated mechanical load event that will alter a total mechanical load on the diesel engine;
    apply a feedforward offset, based on said anticipated mechanical load event, to the feedback control command according to a feedback offset function, wherein according to the feedback offset function a magnitude of the feedback offset is decreased over a period of time; and generate one or more control signals to actuators of the diesel engine, wherein the one or more control signals are configured to operate the diesel engine based on a torque output command indicative of a sum of the feedback control command and the feedforward offset.

\* \* \* \* \*